(12) United States Patent
Mohler

(10) Patent No.: US 7,616,751 B2
(45) Date of Patent: Nov. 10, 2009

(54) MANAGING HELD TELEPHONE CALLS BY USING A MESSAGING RESOURCE

(75) Inventor: David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 917 days.

(21) Appl. No.: 11/179,737

(22) Filed: Jul. 12, 2005

(65) Prior Publication Data

US 2007/0025541 A1     Feb. 1, 2007

(51) Int. Cl.
*H04M 3/42* (2006.01)

(52) U.S. Cl. .............................. 379/213.01; 379/211.01; 379/88.17; 379/88.23

(58) Field of Classification Search ............ 379/213.01, 379/88.23, 88.13, 88.17, 126, 37–41, 211.01, 379/86.23, 13.01
See application file for complete search history.

(56) References Cited

U.S. PATENT DOCUMENTS

| | | | |
|---|---|---|---|
| 6,141,328 A | | 10/2000 | Nabkel et al. |
| 6,324,265 B1 * | | 11/2001 | Christie et al. ........... 379/88.23 |
| 6,327,343 B1 * | | 12/2001 | Epstein et al. ........... 379/88.01 |
| 6,735,295 B1 | | 5/2004 | Brennan et al. |
| 6,920,208 B1 * | | 7/2005 | Rosen et al. ................. 379/126 |
| 7,042,350 B2 * | | 5/2006 | Patrick et al. ............... 340/521 |
| 7,136,475 B1 * | | 11/2006 | Rogers et al. .......... 379/213.01 |
| 7,184,533 B1 * | | 2/2007 | Shaffer et al. .......... 379/211.01 |
| 2002/0080928 A1 * | | 6/2002 | Bates et al. .............. 379/88.21 |
| 2005/0107072 A1 | | 5/2005 | True et al. |
| 2006/0018447 A1 * | | 1/2006 | Jacovi et al. ............. 379/88.17 |

* cited by examiner

*Primary Examiner*—Curtis Kuntz
*Assistant Examiner*—Phung-Hoang J Nguyen
(74) *Attorney, Agent, or Firm*—DeMont & Breyer, LLC

(57) ABSTRACT

A method and apparatus are disclosed that provide a technique for managing held calls. In accordance with the illustrative embodiment of the present invention, a call-handling system receives a first indication of whether a messaging resource is available at or near a terminal for which the system is receiving incoming calls. Examples of messaging resources include instant messaging, email, short messaging service, and so forth. The system might also receive a second indication of whether a messaging resource is available at or near the originating terminal of an incoming call. If the first indication and second indication match, the system will prompt the caller of the originating terminal to use the available messaging resource. In some embodiments, the system will also assign the corresponding incoming call a lower priority relative to other calls because of the availability of the alternative form of communication to the caller.

18 Claims, 9 Drawing Sheets

MANAGING HELD TELEPHONE CALLS BY USING A MESSAGING RESOURCE

FIELD OF THE INVENTION

The present invention relates to telecommunications in general, and, more particularly, to handling one or more held calls by using a messaging resource.

BACKGROUND OF THE INVENTION

FIG. 1 depicts a schematic diagram of a telecommunications system in the prior art. Telecommunications system 100 comprises:
 i. telecommunications network 101,
 ii. network telecommunications terminals 102 and 103,
 iii. private branch exchange 105,
 iv. on-premises telecommunications terminals 106 and 107,
 v. mobile switching center 110,
 vi. cellular network 111, and
 vii. cellular telecommunications terminals 112 and 113, all of which are interconnected as shown.

Telecommunications network 101 is one of multiple, telecommunications networks that are represented in FIG. 1. Telecommunications network 101 comprises the Public Switched Telephone Network, which is a complex of telecommunications equipment that is owned and operated by different entities throughout the World. In the United States of America, for example, the Public Switched Telephone Network (or "PSTN")comprises an address space that is defined by ten digits, and, therefore, comprises 10 billion unique addresses or "telephone numbers." The public switched telephone networks in other countries are similar.

Network 101 interconnects the other telecommunications networks, which include: (i) the enterprise network supported by private branch exchange 105, and (ii) cellular network 111 supported by mobile switching center 110. The enterprise network supported by private branch exchange 105 provides telecommunications service to one or more telecommunications terminals, for example terminals 106 and 107, within the enterprise area served, such as an office building or campus. Cellular network 111, which is supported by mobile switching center 110, provides telecommunications service to one or more cellular telecommunications terminals, including terminals 112 and 113.

Additionally, network 101 provides telecommunications service to other telecommunications terminals, such as terminals 102 and 103. For example, terminal 102 or 103 might originate a call that routes through network 101 to private branch exchange 105.

Mobile switching center 110 is capable of switching incoming calls from network 101 to cellular-capable terminals that have registered with switching center 110, such as terminals 112 and 113. Switching center 110 is also capable of handling outgoing calls from cellular-capable terminals to network 101. Switching center 110 communicates with terminals 112 and 113 via one or more radio base stations in cellular network 111.

Private branch exchange (PBX) 105 is capable of switching incoming calls (e.g., from terminal 102, etc.) from telecommunications network 101 via one or more communications paths to one or more on-premises terminals, such as on-premises terminals 106 and 107. Private branch exchange 105 is also capable of handling outgoing calls from on-premises terminals to network 101 via one or more communications paths.

Private branch exchange 105 is also capable of forwarding an incoming call, such as from terminal 102, to a telephone number of a PBX user's "off-premises" terminal that is accessible through network 101. This type of forwarding to a terminal affiliated with exchange 105 is also known as "extending" a call because the connection to the off-premises terminal appears to exchange 105 as an additional PBX line. Exchange 105 extends the call to the off-premises terminal in addition to switching the same incoming call to an "on-premises terminal" within the enterprise area that exchange 105 serves. In telecommunications system 100, terminals 106 and 107 are on-premises terminals with respect to private branch exchange 105, while terminals 103 and 112 are off-premises terminals with respect to exchange 105. Note that in system 100, terminals 102 and 113 are not off-premises terminals because, unlike terminals 103 and 112, they are not affiliated with exchange 105.

To accomplish (i) the switching of an incoming, enterprise-related call to an on-premises terminal and (ii) the extending of the call to the correct off-premises terminal, private branch exchange 105 maintains a table that correlates the off-premises telephone number to the on-premises, private branch exchange extension. Table 1 depicts a table that illustrates the correlation.

TABLE 1

PBX Extension-to-PSTN Number Database

| On-Premises Telecommunications Terminal | Private Branch Exchange Extension | Telecommunications Network Number |
|---|---|---|
| 106 | 732-555-0102, x11 | 201-555-1236 |
| 107 | 732-555-0102, x12 | 908-555-3381 |
| ... | ... | ... |

As an example, a first caller at terminal 102 who wishes to reach the PBX user of terminal 106 dials the PBX number (i.e., 732-555-0102). Private branch exchange 105 receives the incoming call and the extension number (i.e., x11) as specified by the caller. By using stored information that is similar to the information in Table 1, private branch exchange 105 determines that the call is also to be extended to off-premises telephone number 201-555-1236. This is the telephone number that is associated with off-premises terminal 112, which belongs to the PBX user of terminal 106. Exchange 105 then extends the call to terminal 112. The idea behind transmitting the call to both terminals 106 and 112 (or sometimes to terminal 112 only) is that if the PBX user is not reachable at his office phone (i.e., terminal 106), then possibly he is reachable at a phone that is outside of the office (i.e., terminal 112). The extending of the call to an off-premises terminal enhances the caller's experience by only requiring the caller to use a single telephone number to reach the PBX user, regardless of whether or not the PBX user is in the office.

Continuing with the example, a second caller at terminal 113, who also wishes to reach the PBX user of terminal 106, dials the same PBX number (i.e., 732-555-0102). Private branch exchange 105 receives the second incoming call and the extension number (i.e., x11) as specified by the caller, and determines that terminal 112 is the intended recipient for the second call also. Terminal 112, however, is already handling the first call; consequently, exchange 105 holds the second call.

At this point in the example, private branch exchange 105 is holding one call for off-premises terminal 112. Furthermore, if one or more additional calls arrive with terminal 112 as the intended terminal, private branch exchange 105 will have to maintain multiple held calls for terminal 112, as well as any calls that are being held for other off-premises terminals, such as terminal 103. The user of the off-premises terminal, which is typically an ordinary cell phone or wireline telephone, cannot easily keep track of various held-call characteristics, such as: (i) whether there are calls still on hold and (ii) if there are held calls, the number of calls on hold. Furthermore, a backlog of held calls can become overwhelming for the user to deal with. What is needed is a technique to manage held calls, without some of the disadvantages of the prior art.

SUMMARY OF THE INVENTION

The present invention provides a technique for managing held calls, without some of the disadvantages of the prior art. In particular, a call-handling system (e.g., a private branch exchange, a contact center, etc.) that manages the held calls for one or more affiliated telecommunications terminals receives inputs from a called party or a calling party, or both. The call-handling system uses the received inputs from either party to determine how it should handle a call. If the system is to hold (e.g., queue, etc.) the call, it uses the inputs to determine how it should prioritize the call relative to other calls. Alternatively, if the system is to provide the caller with another option (e.g., messaging the called party, etc.), it uses the inputs to determine what that option might be.

In accordance with the illustrative embodiment of the present invention, the call-handling system receives a first indication of whether a messaging resource is available at or near a telecommunications terminal for which the system is receiving a call. Examples of messaging resources include instant messaging, email, short message service, and so forth. The system might also receive a second indication of whether a messaging resource is available at or near the originating terminal of the received call. If the first indication and second indication match (i.e., the types of messaging resources match and are available for use), the system will prompt the caller at the originating terminal to use the available messaging resource. In some embodiments, the call-handling system will assign to the corresponding call a lower priority relative to other queued calls because of the availability of the alternative form of communication to the caller.

The terminal for which a call is intended transmits its availability indication via a network that is different from the network that the terminal uses to transmit voice signals, in accordance with the illustrative embodiment. For example, the terminal might transmit the availability indication via a WiFi-based, local area network and the voice signals from the terminal's user via a cellular network. This obviates having to modify existing protocols in the voice network to accommodate the availability indication. As those who are skilled in the art will appreciate, however, there are alternative embodiments in which the terminal can transmit the availability indication and the voice signals via the same network (e.g., cellular, etc.).

The technique in the illustrative embodiment has advantages over at least some techniques of the prior art. First, the technique in the illustrative embodiment arranges and subsequently presents the held calls to the intended terminal in an order that better reflects the caller's need to communicate with the terminal's user. Consider that if the caller has been given an option to contact the user via an alternative method (e.g., instant messaging, email, etc.) and still chooses to wait in the call queue, then the caller's need to contact the user is probably not urgent. Second, the technique provides the caller with an alternative method of contacting the user, which is satisfying to the caller because the caller now has more than one contacting option. Third, the technique results in the user tending to receive fewer voice calls by shifting the form of communication to one or more forms of messaging. This can speed up the user's ability to address the callers' needs, especially considering that the user may be able to handle both a voice call from a first caller and a message from a second caller concurrently.

The illustrative embodiment of the present invention comprises: (a) holding, at a private branch exchange, one or more calls for a first telecommunications terminal, wherein the first telecommunications terminal is an off-premises terminal to which the private branch exchange has extended at least one call; (b) receiving, from the first telecommunications terminal, a first signal that identifies: (i) a first call of the one or more calls, and (ii) a first telecommunications terminal address; and (c) transmitting, to the originating telecommunications terminal of the first call, a prompt to send a first message via a first messaging resource to the first telecommunications terminal address.

DETAILED DESCRIPTION

Figure 1:
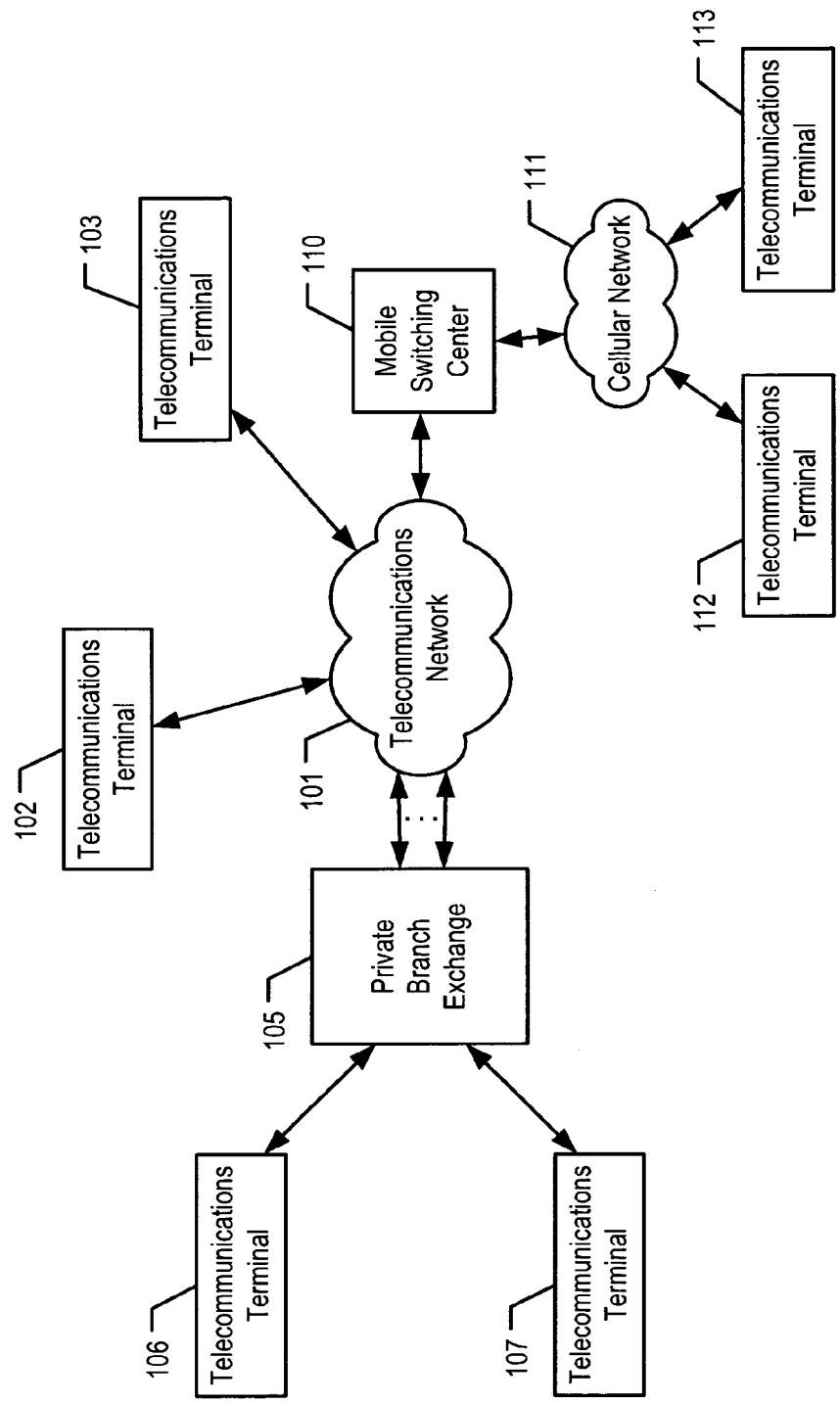
FIG. 1 depicts a schematic diagram of telecommunications system 100 in the prior art.
Figure 2:
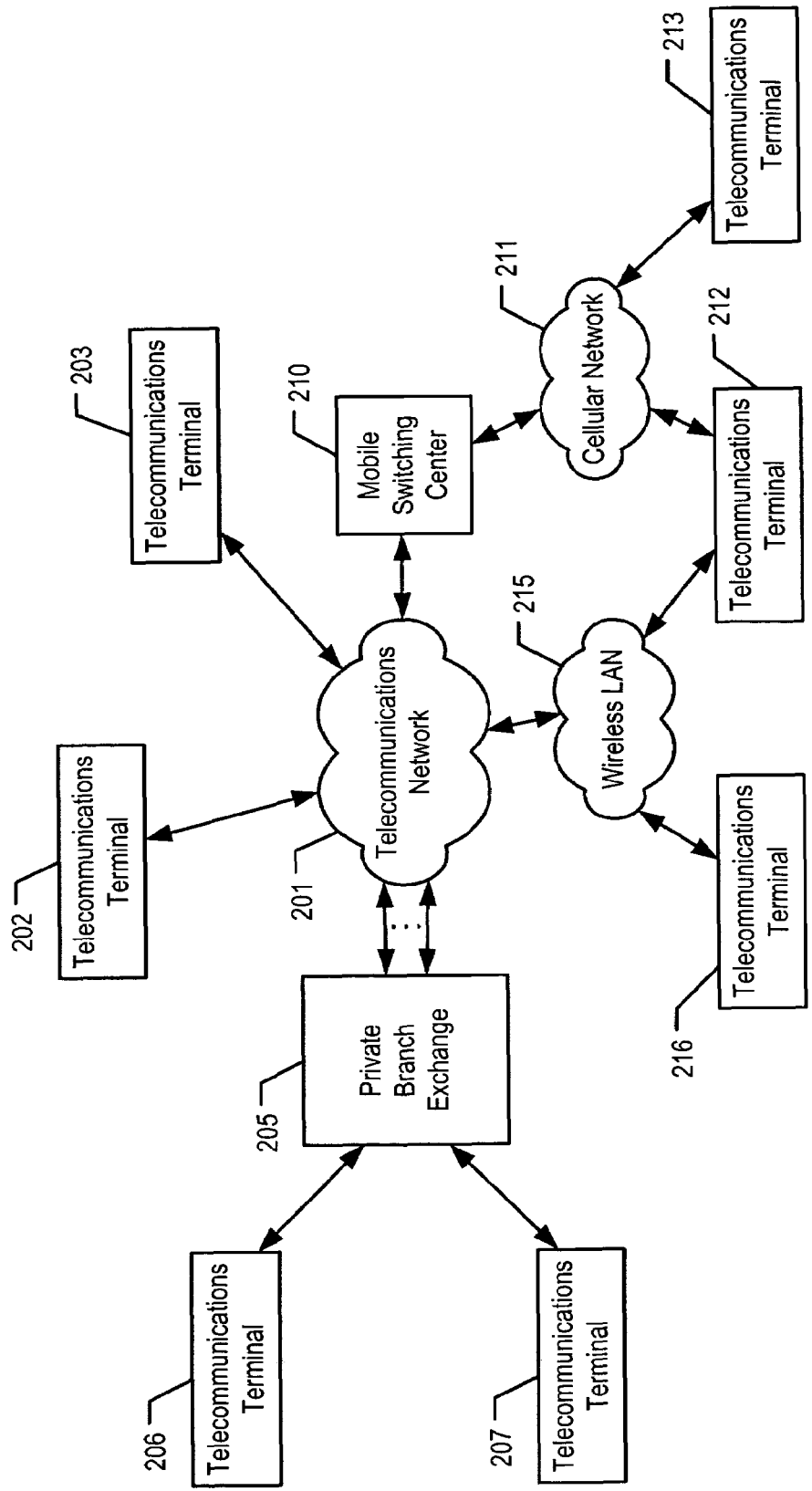
FIG. 2 depicts a schematic diagram of telecommunications system 200, in accordance with the illustrative embodiment of the present invention.

FIG. 2 depicts a schematic diagram of a telecommunications system, in accordance with the illustrative embodiment of the present invention. Telecommunications system 200 comprises:

i. telecommunications network 201,
    ii. network telecommunications terminals 202 and 203,
    iii. private branch exchange 205,
    iv. on-premises telecommunications terminals 206 and 207,
    v. mobile switching center 210,
    vi. cellular network 211,
    vii. cellular telecommunications terminals 212 and 213,
    viii. wireless local area network (LAN) 215, and ix. data telecommunications terminal 216, all of which are interconnected as shown.

Telecommunications network 201 is one of multiple networks that are represented in FIG. 2. Telecommunications network 201 comprises the Public Switched Telephone Network (PSTN), in accordance with the illustrative embodiment. Through Public Switched Telephone Network infrastructure, as well as through other switching and transmission infrastructure, network 201 provides telecommunications service to terminals such as network telecommunications terminals 202 and 203.

Network 201 interconnects the other telecommunications networks, which include: (i) the enterprise network supported by private branch exchange 205, (ii) cellular network 211 supported by mobile switching center 210, and (iii) wireless local area network 215. The enterprise network supported by private branch exchange 205 provides telecommunications service to one or more telecommunications terminals, for example terminal 206 and 207, within the enterprise area served, such as an office building or campus. Cellular network 211, which is supported by mobile switching center 210, provides telecommunications service to one or more cellular telecommunications terminals, including cellular telecommunications terminals 212 and 213. Wireless local area network 215 provides telecommunications service to one or more wireless, data-capable terminals, such as dual-mode, cellular telecommunications terminal 212 and data telecommunications terminal 216 (e.g., a laptop, a personal digital assistant [PDA], etc.). Wireless local area network 215 comprises infrastructure such as an access point and a gateway, as are known in the art. The access point communicates with the wireless terminals, and the gateway communicates with network 201. In some embodiments, network 215 is WiFi-based, as is known in the art.

FIG. 2 also depicts multiple telecommunications terminals of various types. Those terminal types include Plain Old Telephone Service (POTS) terminals, as exemplified by terminal 202; office desksets, as exemplified by terminals 206 and 207; cell phones, as exemplified by terminals 212 and 213; laptops with wireless network adapters, as exemplified by terminal 216; and so forth. Furthermore, some terminals, such as dual-mode terminal 212, are capable of communications via multiple networks, such as cellular network 211 and wireless local area network 215. As those who are skilled in the art will appreciate, the present invention is also applicable to other combinations of terminals than what FIG. 2 depicts.

Private branch exchange 205 is a data-processing system, the salient components of which are described below and with respect to FIG. 3. Private branch exchange 205 is capable of switching incoming calls (e.g., from terminal 202, etc.) from network 201 via one or more communications paths to "on-premises" terminals, such as terminals 206 and 207. Exchange 205 is also capable of handling outgoing calls from on-premises terminals to network 201 via one or more communications paths.

Private branch exchange 205 is also capable of extending an incoming call (e.g., from terminal 202, etc.) to a telephone number of an "off-premises" terminal. From exchange 205's perspective, an "off-premises" terminal is a terminal that is accessible through network 201 while still being affiliated with exchange 205 as an extension to exchange 205's enterprise network. For pedagogical purposes, telecommunications terminals 203 and 212 are the off-premises terminals in telecommunications system 200. Exchange 205 is capable of extending the incoming call to the intended off-premises terminal in addition to or independently of switching the same incoming call to an on-premises terminal within the enterprise area that exchange 205 serves.

Private branch exchange 205 is connected to telecommunications systems that are present in network 201 via communications paths that comprise Integrated Services Digital Network (ISDN) trunks, as are known in the art. As those who are skilled in the art will appreciate, other types of communications paths might connect exchange 205 to network 201. For example, exchange 205 might receive at least some of the incoming calls via the Session Initiation Protocol over an Internet Protocol-based network.

It will be clear to those skilled in the art, after reading this disclosure, how to make and use alternative embodiments of the present invention in which private branch exchange 205 provides telecommunications service to a different number of on-premises terminals and a different number of off-premises terminals than those depicted.

Private branch exchange 205 is also capable of performing the tasks described below and with respect to FIGS. 5 through 8, in accordance with the illustrative embodiment. It will be clear to those skilled in the art, after reading this disclosure, how to make and use private branch exchange 205. Moreover, as those who are skilled in the art will appreciate, there can be alternative embodiments of the present invention in which a switch, contact center, or other type of data-processing system than a private branch exchange performs the described tasks. The data processing systems in those alternative embodiments inter-operate with the Public Switched Telephone Network that constitutes network 201 or with another type of network entirely (e.g., an Internet Protocol-based network, a wireless network, etc.). Putting it differently, the present invention is equally well suited for implementation in public and private telecommunications systems, and in wireline and wireless systems as well.

Mobile switching center 210 is capable of switching incoming calls from network 201 to registered cellular-capable terminals, such as terminals 212 and 213. Mobile switching center 210 is also capable of handling outgoing calls from cellular-capable terminals to network 201. Switching center 210 communicates with terminals 212 and 213 via one or more radio base stations in cellular network 211, in well-known fashion. It will be clear to those skilled in the art how to make and use mobile switching center 210.

Off-premises telecommunications terminals 203 and 212 are capable of originating and receiving calls in well-known fashion. Some of the originated or received calls are routed through private branch exchange 205, while some of the calls are not. Terminals 203 and 212 are also capable of performing the tasks described below and with respect to FIG. 9, in accordance with the illustrative embodiment. Terminals 203 and 212 in the illustrative embodiment are a wireline terminal and a cellular phone, respectively. As those who are skilled in the art will appreciate, the off-premises terminals in telecommunications system 200 can also include other types of terminals (e.g., softphones, ISDN terminals, etc.). It will be clear to those skilled in the art, after reading this specification, how to make and use off-premises telecommunications terminals 203 and 212.

Figure 3:
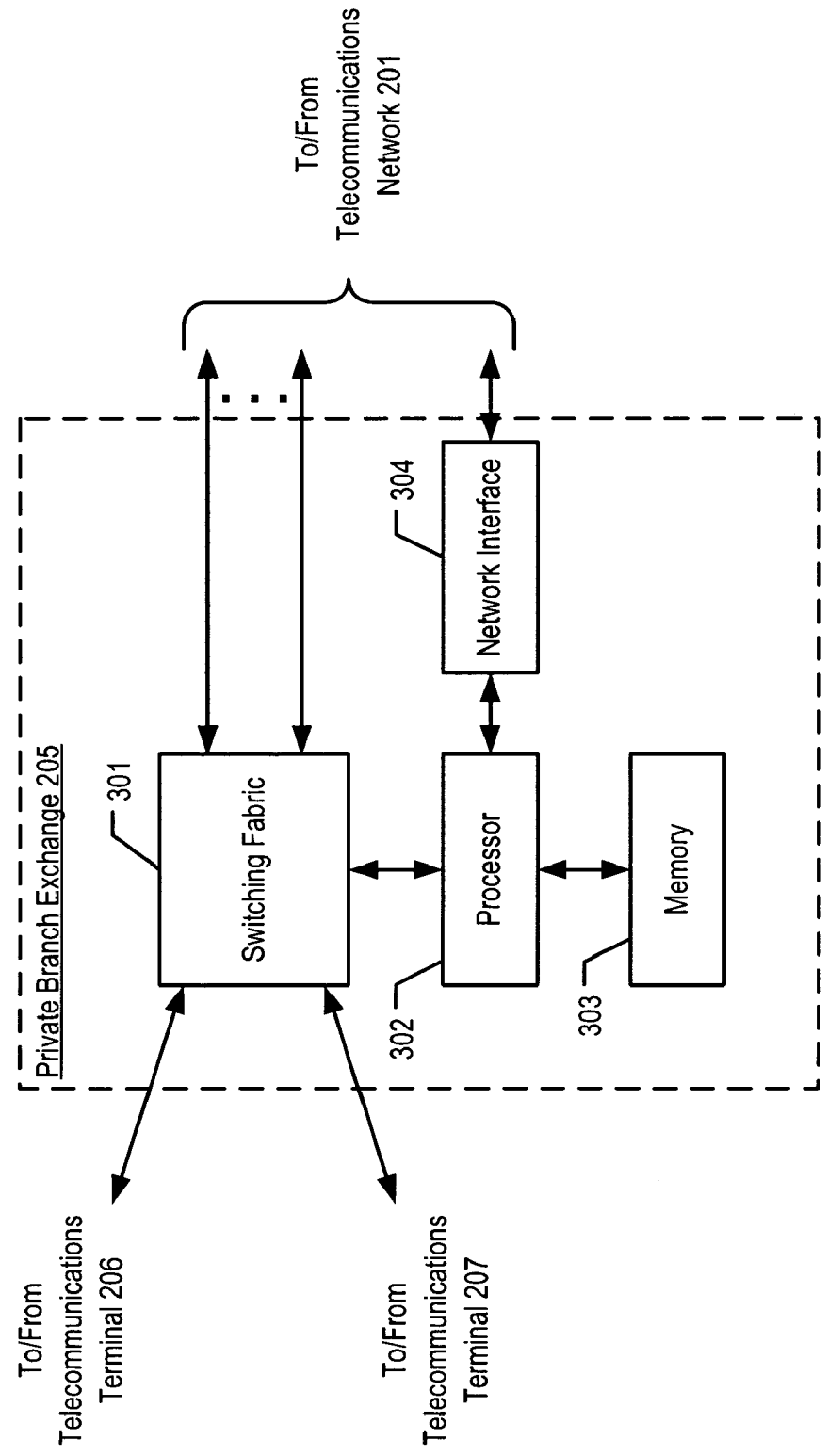
FIG. 3 depicts a block diagram of the salient components of private branch exchange 205, which is part of telecommunications system 200.

FIG. 3 depicts a block diagram of the salient components of private branch exchange 205 in accordance with the illustrative embodiment of the present invention. Private branch exchange 205 comprises: switching fabric 301, processor 302, memory 303, and network interface 304, interconnected as shown.

Switching fabric 301 is capable of switching calls between on premises terminals (e.g., terminals 206 and 207, etc.), and terminals that are accessible through network 201. In addition, switching fabric 301 is capable of performing the tasks described below and with respect to FIGS. 5 through 8, under the direction of processor 302. It will be clear to those skilled in the art how to make and use switching fabric 301.

Processor 302 is a general-purpose processor that is capable of receiving called-related data from switching fabric 301, of reading data from and writing data to memory 303, and of executing the tasks described below and with respect to FIGS. 5 through 8. In some alternative embodiments of the present invention, processor 302 might be a special-purpose processor. In either case, it will be clear to those skilled in the art, after reading this disclosure, how to make and use processor 302.

Memory 303 is a non-volatile random-access memory that stores the instructions and data used by processor 302. Memory 303 stores the PBX on-premises extension and affiliated off-premises telephone number for each PBX user, which are shown in Table 1. Memory 303 also stores, for each off-premises terminal that is affiliated with exchange 205, the sequence of identifiers (i.e., the queue) that is described below and with respect to FIGS. 5 through 8. It will be clear to those skilled in the art, after reading this disclosure, how to make and use memory 303.

Network interface 304 is capable of routing control-related signals between processor 302 and off-premises terminals 203 and 212, in accordance with the illustrative embodiment of the present invention. In accordance with the illustrative embodiment, network interface 304 is separate from switching fabric 301 and handles control signals transmitted on signal paths that are separate from the voice paths. In some alternative embodiments, network interface is integrated with switching fabric 301 and handles control signals that are present in the voice paths. It will be clear to those skilled in the art how to make and use network interface 304.

Figure 4:
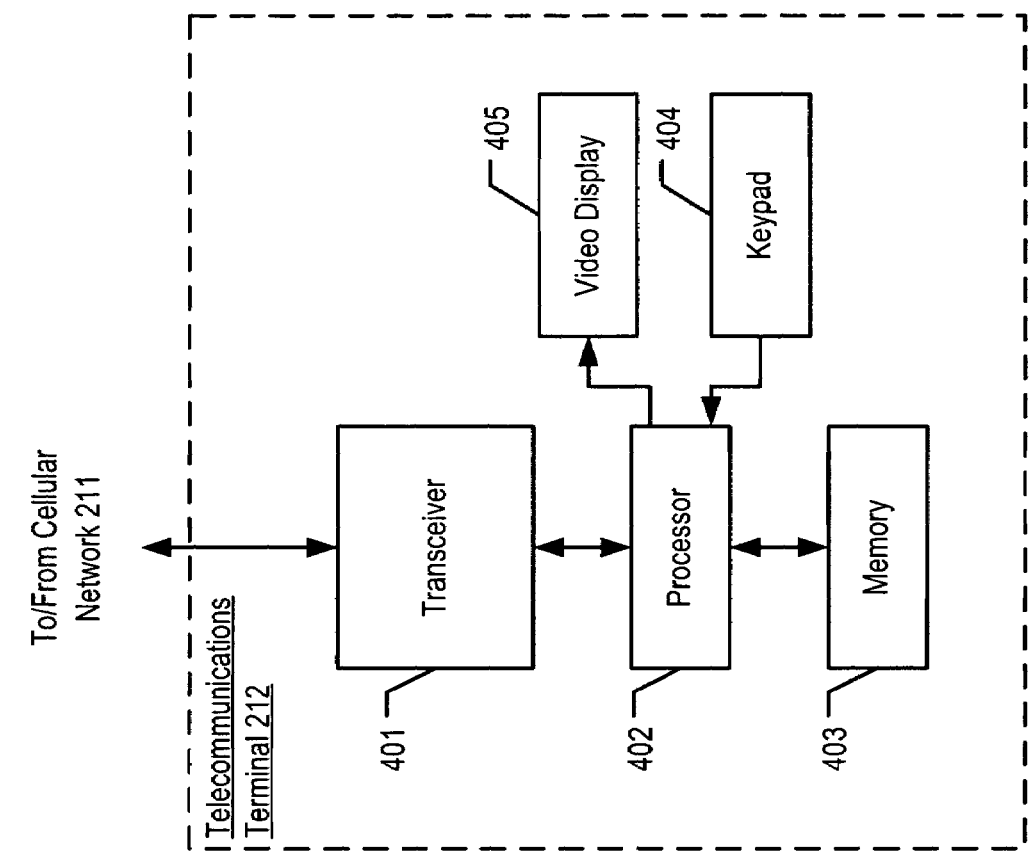
FIG. 4 depicts a block diagram of the salient components of off-premises telecommunications terminal 212, which is part of telecommunications system 200.

FIG. 4 depicts a block diagram of the salient components of off-premises telecommunications terminal 212, in accordance with the illustrative embodiment of the present invention. Although cellular terminal 212 is the terminal represented in FIG. 4, it will be clear to those skilled in the art, after reading this disclosure, how to make and use other off-premises terminals (e.g., terminal 203, etc.) according to what is described with respect to FIGS. 4 and 9. Telecommunications terminal 212 comprises: transceiver 401, processor 402, memory 403, keypad 404, and video display 405, interconnected as shown.

Transceiver 401 comprises a receiving part and a transmitting part. The receiving part receives signals from cellular network 211, and forwards the information encoded in the signals to processor 402, in well-known fashion. The transmitting part receives information from processor 402, and outputs signals that encode this information to cellular network 211, in well-known fashion. It will be clear to those skilled in the art how to make and use transceiver 401.

Processor 402 is a general-purpose processor that is capable of: receiving information from transceiver 401 and keypad 404; reading data from and writing data into memory 403; executing the tasks described below and with respect to FIG. 9; and transmitting information to transceiver 401 and video display 405. In some alternative embodiments of the present invention, processor 402 might be a special-purpose processor. In either case, it will be clear to those skilled in the art, after reading this disclosure, how to make and use processor 402.

Memory 403 is a non-volatile random-access memory that stores the instructions and data used by processor 402. It will be clear to those skilled in the art how to make and use memory 403.

Keypad 404 is a character and user-selection input device as is well known in the art that receives input from a user and transmits keypad signals representing that input. Keypad 404 comprises fixed function keys and soft keys, as are known in the art. It will be clear to those skilled in the art how to make and use keypad 404.

Video display 405 is a display output device as is well known in the art that receives a video signal and creates a visual image of the signal for a user. It will be clear to those skilled in the art how to make and use video display 405.

Figure 5:
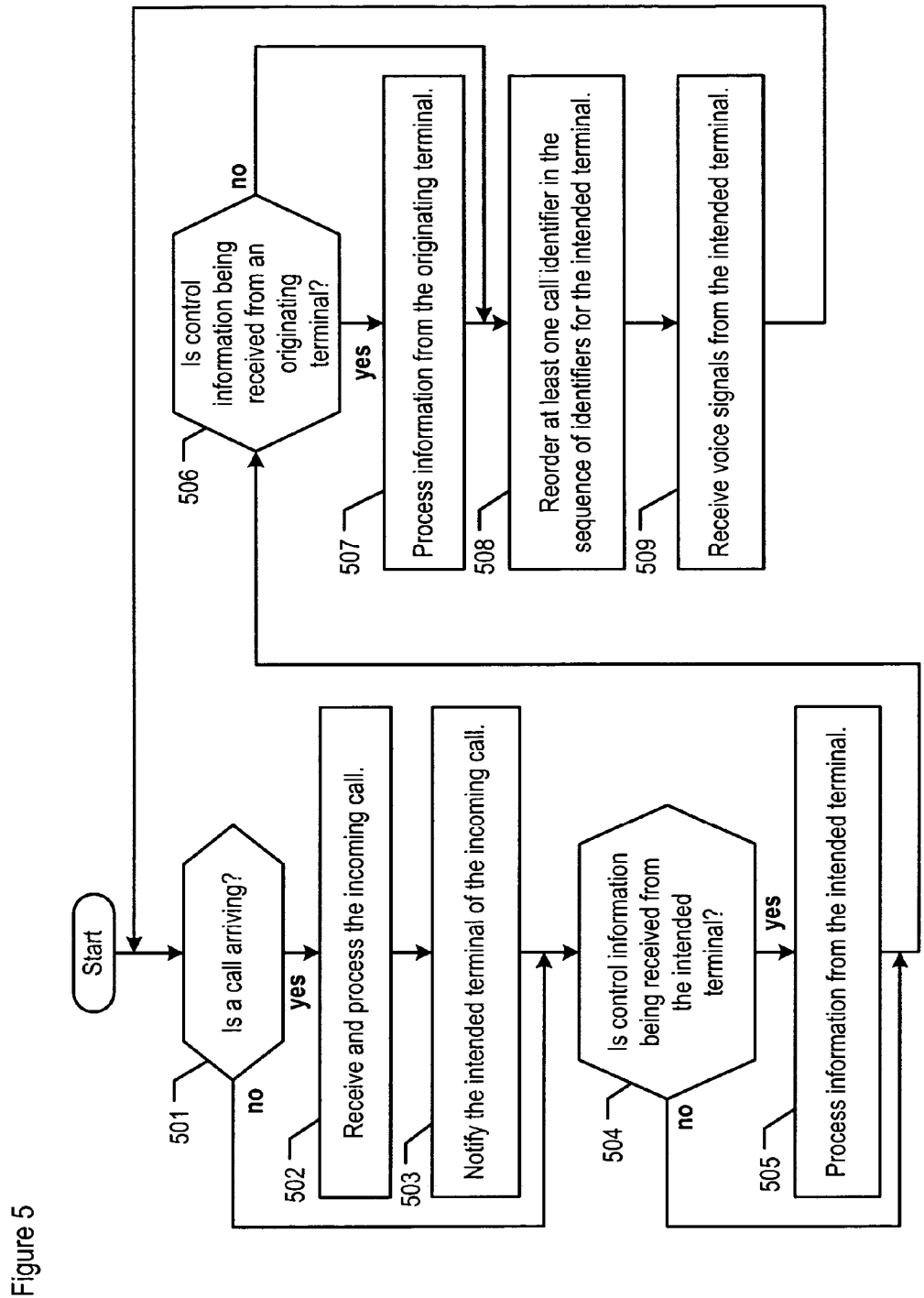
FIG. 5 depicts a flowchart of the operation of private branch exchange 205 when handling one or more calls that are intended for a telecommunications terminal.

FIG. 5 depicts a flowchart of the operation of private branch exchange 205 when handling one or more calls that are intended for a telecommunications terminal, in accordance with the illustrative embodiment of the present invention. Off-premises terminal 212 exemplifies the intended, telecommunications terminal that is referred to in the described tasks; however, as those who are skilled in the art will appreciate, the tasks described with respect to FIG. 5 can also apply to other telecommunications terminals. Furthermore, it will also be appreciated that private branch exchange 205 can handle calls that are intended for more than one telecommunications terminal simultaneously by applying the described tasks to each terminal. It will be clear to those skilled in the art which tasks depicted in FIG. 5 can be performed simultaneously or in a different order than that depicted.

At task 501, private branch exchange 205 checks if a call is arriving (e.g., from network 201, etc.). If a call is arriving, task execution proceeds to task 502. Otherwise, task execution proceeds to task 504.

At task 502, exchange 205 receives an incoming call in well-known fashion and determines that the call is intended for terminal 212. Exchange 205 determines, in well-known fashion, that the call is intended for terminal 212 by determining that the called telephone number arriving with the incoming call maps to one or more terminals that include terminal 212. Alternatively, exchange 205 might assess the need of the caller, who might be a customer with a question, and accordingly assign the call to the user of terminal 212, a technical support rep.

Exchange 205 checks if a call identifier is available for the incoming call. Exchange 205 uses the call identifier, as part of a sequence of call identifiers, to: (i) identify a particular call to the off-premises terminal for which the call is intended, and (ii) queue and hold the particular call. An example of a call identifier is the Caller Identification (CLID), as is known in the art. In accordance with the illustrative embodiment, exchange 205 automatically determines the call identifier as each call arrives. In some alternative embodiments, exchange 205 requests a call identifier from the caller. In requesting the call identifier, exchange 205 can use an interactive voice response (IVR)-like prompt (e.g., "speak your name after the tone," etc.) to request the name, telephone number, or other identifier from the caller, and then uses voice recognition to generate a storable call identifier.

Exchange 205 also determines whether it should hold the call for terminal 212. For example, if all of the call appearances that terminate at terminal 212 are currently in use, then exchange 205 holds the call for terminal 212 (i.e., the call "waits" at exchange 205).

At task 503, exchange 205 notifies terminal 212 of the arrived call. For example, if terminal 212 is already involved in a call, exchange 205 transmits a call-waiting indication to terminal 212 in well-known fashion.

At task 504, exchange 205 checks if it is receiving control information from terminal 212. If it is receiving control information, task execution proceeds to task 505. Otherwise, task execution proceeds to task 506.

At task 505, exchange 205 receives and processes the control information that it has received from terminal 212. How exchange 205 processes the information is described below and with respect to FIG. 6.

At task 506, exchange 205 checks if it is receiving control information from an originating terminal—that is, a terminal responsible for a call (either incoming or already held) for terminal 212. If it is receiving control information, task execution proceeds to task 507. Otherwise, task execution proceeds to task 508.

At task 507, exchange 205 receives and processes the control information that it has received from the originating terminal. How exchange 205 processes the information is described below and with respect to FIG. 7.

At task 508, exchange 205 reorders at least one call (as represented by a call identifier) in the queue (i.e., sequence of identifiers) of held calls that it maintains for terminal 212. Exchange 205 bases the reordering on one or more of: (i) the incoming call, (ii) the control information received from terminal 212 (i.e., the terminal for which the call is intended), and (iii) the control information received from the originating terminal. How exchange 205 reorders the calls in the queue is described below and with respect to FIG. 8. In accordance with the illustrative embodiment, the call queue for terminal 212 reflects the order in which calls are presented to terminal 212. The presentation of the calls can refer to the actual delivery of the calls to terminal 212 or to the way that exchange 205 updates terminal 212 about the held calls.

At task 509, exchange 205 receives voice signals from terminal 212 in well-known fashion. In some embodiments, exchange 205 receives voice signals via a network that is different from the network used to receive some or all of the control information referred to earlier. For example, exchange 205 might receive the voice signals via a cellular network and the control information via a wireless local area network (e.g., WiFi-based, etc.). Task execution then proceeds back to task 501.

Figure 6:
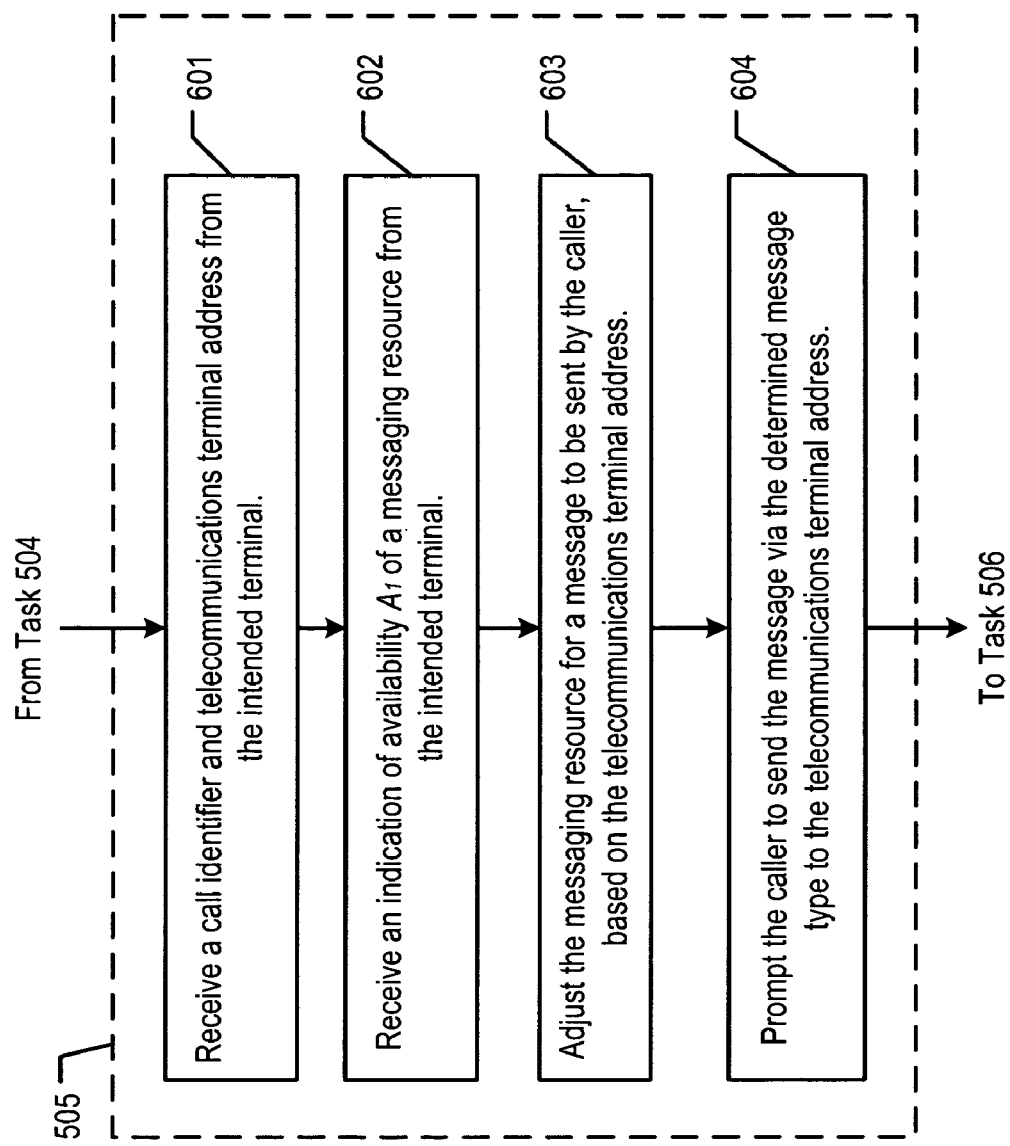
FIG. 6 depicts a flowchart of the operations that are related to task 505, which concerns the processing of control information from terminal 212 (i.e., the illustrative telecommunications terminal).

FIG. 6 depicts a flowchart of the operations that are related to task 505, which concerns the processing of control information from terminal 212 (i.e., the illustrative telecommunications terminal), in accordance with the illustrative embodiment of the present invention. It will be clear to those skilled in the art which tasks depicted in FIG. 6 can be performed simultaneously or in a different order than that depicted.

At task 601, exchange 205 receives a call identifier and a telecommunications terminal address from terminal 212. The telecommunications terminal address is the alternative address to which the caller may send a message, instead of waiting in the call queue. The telecommunications terminal address can be one of a SIP address, an email address, an IM name and domain, and so forth.

At task 602, exchange 205 optionally receives, from terminal 212, an indication of availability $A_1$ of a messaging resource. Availability indication $A_1$ indicates whether a particular messaging resource is presently available at or near terminal 212. Possible messaging resources include, but are not limited to, email, instant messaging, and short message service. For example, suppose that either the user of terminal 212 has access to or terminal 212 itself has instant messaging capability. Furthermore, instant messaging capability is presently available—that is, the user of terminal 212 can be reached via instant messaging. Terminal 212 would transmit indication $A_1$ to indicate that instant messaging is presently available.

At task 603, exchange 205 determines the messaging resource that a caller may use to contact terminal 212's user. Exchange 205 uses the availability indication $A_1$, if received, to determine the messaging resource to be used by the caller who corresponds to the call identifier received at task 601. Alternatively, if availability indication $A_1$ has not been received, in accordance with the illustrative embodiment, exchange 205 examines the format of the telecommunications terminal address provided by terminal 212 to determine the messaging resource to be used by the caller.

At task 604, exchange 205 prompts the caller to send a message via the determined messaging resource to the indicated telecommunications terminal address. For example, exchange 205 might play the following message: "For faster service, please contact the party you called by sending a Yahoo or AOL instant message to 'abc_company_tech12'."
In some embodiments, exchange 205 might also either (i) reorder the priority of the relevant call relative to that of other held calls (as described below and with respect to task 801) or (ii) drop the relevant call. After task 604, task execution proceeds to task 506.

Figure 7:
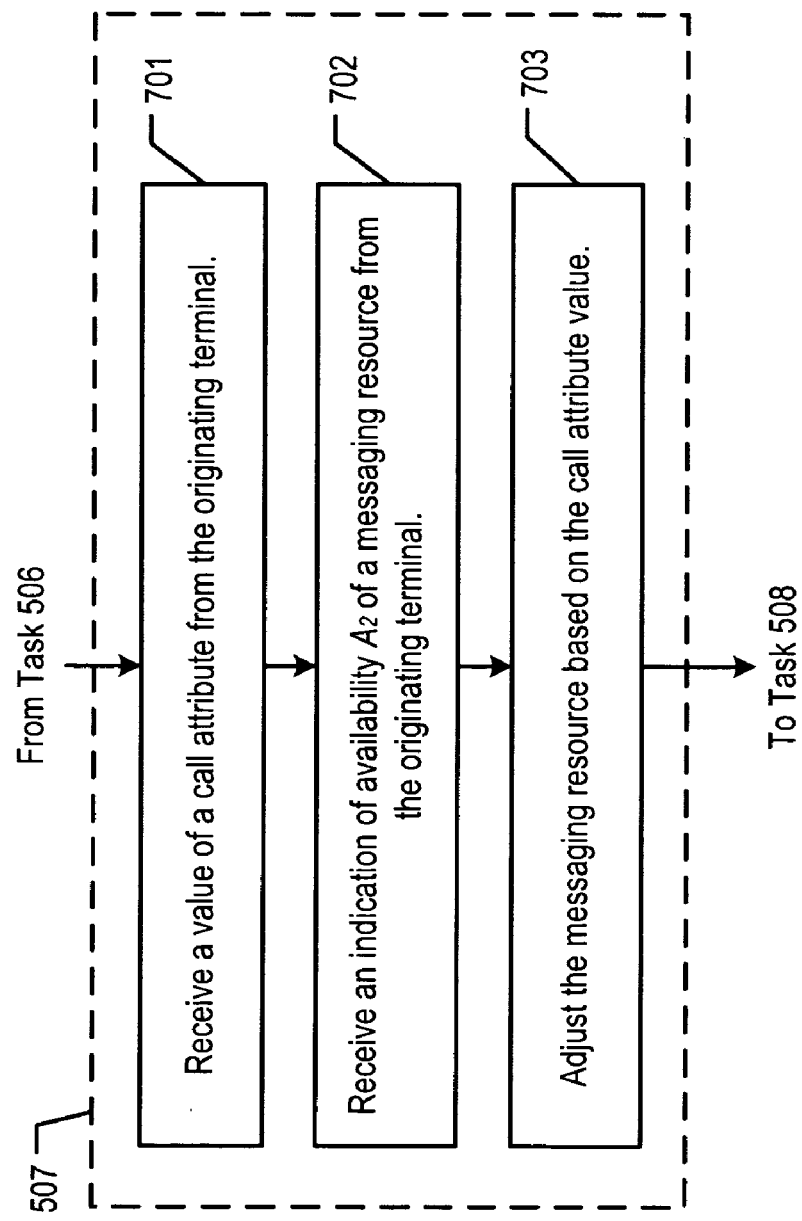
FIG. 7 depicts a flowchart of the operations that are related to task 507, which concerns the processing of control information from a call-originating terminal.

FIG. 7 depicts a flowchart of the operations that are related to task 507, which concerns the processing of control information from a call-originating terminal, in accordance with the illustrative embodiment of the present invention. It will be clear to those skilled in the art which tasks depicted in FIG. 7 can be performed simultaneously or in a different order than that depicted.

At task 701, exchange 205 optionally receives a value of a call attribute (also known as a "call attribute value") from the originating terminal of a call for terminal 212. Exchange 205 uses the call attribute value for a call attribute that is currently in effect, in order to manage the sequence of identifiers that is associated with terminal 212. The call attribute that exchange 205 uses can be one or more of a number of distinctive elements, including: (i) urgency of call, (ii) topic of call, and (iii) estimated length of call. For example, if the call attribute that is currently in effect is the estimated length of a call, a call attribute value from a caller might indicate a "short length," "medium length," or "long length."

In accordance with the illustrative embodiment, the call attribute that is used to manage the sequence of identifiers for terminal 212 is determined by exchange 205. For example, a technician configuring exchange 205 may specify the call attribute to be used. In some alternative embodiments, the call attribute can be provided from terminal 212 (e.g., by its user, etc.).

In some embodiments, exchange 205 might request a call attribute value from the originating terminal. In requesting the call attribute value, exchange 205 can use an IVR-like prompt. For example, exchange 205 might play the following message: "To help us process your call, please enter the estimated call length by pressing '1' for 'short', '2' for 'medium', and '3' for 'long'."

At task 702, exchange 205 optionally receives, from the originating terminal, an indication of availability $A_2$ of a messaging resource. Availability indication $A_2$ indicates whether a particular messaging resource is presently available at or near the originating terminal. Possible messaging resources include, but are not limited to, email, instant messaging, and short message service. For example, suppose that either the user of the originating terminal has access to or the originating terminal itself has instant messaging capability. Furthermore, instant messaging capability is presently available—that is, the user of the originating terminal is able to use instant messaging. The originating terminal would transmit indication $A_2$ to indicate that instant messaging is presently available.

In some embodiments, exchange 205 queries the originating terminal about a particular messaging resource. For example, upon receiving availability indication $A_1$ from the intended terminal at task 602, exchange 205 might then query the originating terminal about the messaging resource indicated in $A_1$. Subsequently, the originating terminal indicates availability in indicator $A_2$. In querying the originating terminal, exchange 205 can use an IVR-like prompt. For example, exchange 205 might play the following message: "To help us process your call, please indicate if you have convenient access to instant messaging capability by pressing '1' for 'yes' or '2' for 'no'."

At task 703, exchange 205 determines the messaging resource that a caller at the originating terminal may use to contact terminal 212's user. Exchange 205 uses the availability indication $A_2$, if received, to determine the messaging resource to be used by the caller who corresponds to the call identifier received at task 601. For example, if email capability is available at or near the originating terminal and exchange 205 already knows that email capability is also available at or near terminal 212, then email is the messaging resource to be used. Task execution then proceeds to task 508.

Figure 8:
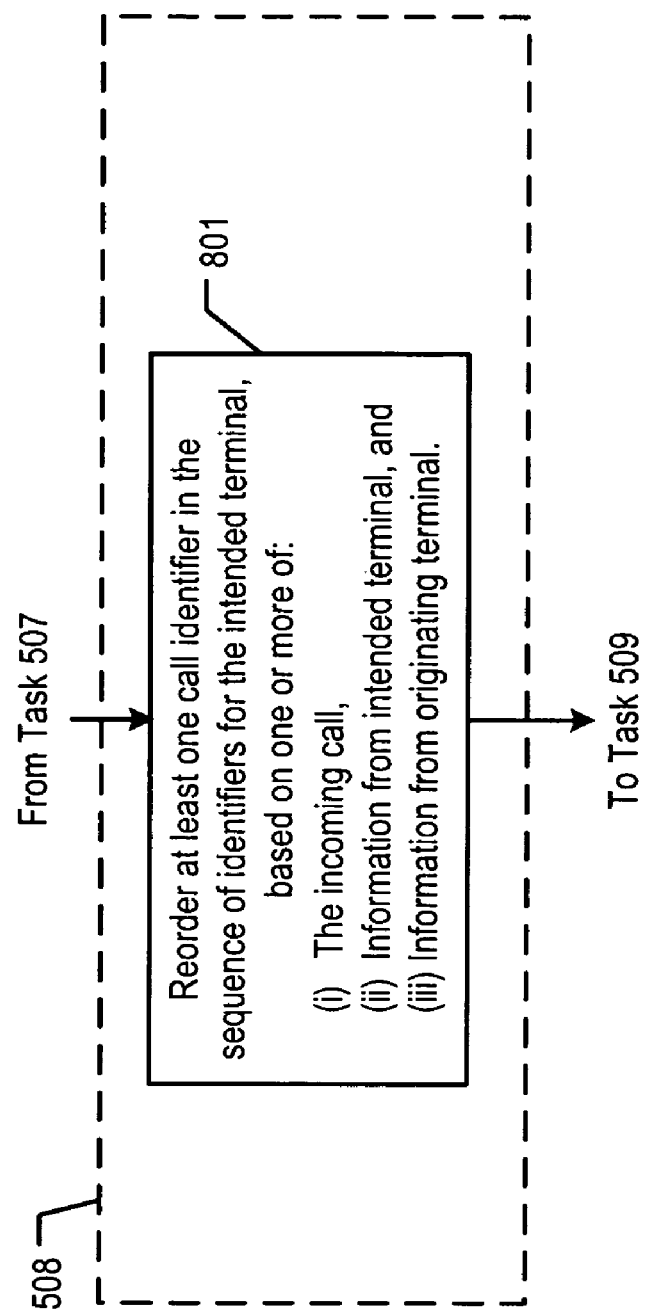
FIG. 8 depicts a flowchart of the operations that are related to task 508, which concerns modifying the order in which held calls are to be presented to the intended terminal.

FIG. 8 depicts a flowchart of the operations that are related to task 508, which concerns modifying the order in which held calls are to be presented to the intended terminal, in accordance with the illustrative embodiment of the present invention. It will be clear to those skilled in the art which tasks depicted in FIG. 8 can be performed simultaneously or in a different order than that depicted.

At task 801, exchange 205 reorders at least one of the call identifiers in the sequence of identifiers for the off-premises terminal. In accordance with the illustrative embodiment of the present invention, as part of the reordering process, exchange 205 considers one or more of: (i) the incoming call, (ii) control information received from terminal 212, and (iii) control information received from the originating terminal of a call that is either incoming or already being held. As those who are skilled in the art will appreciate, exchange 205 might use one or more criteria to determine the reordering of one or more calls in the call queue.

A few examples now follow to illustrate how exchange 205 reorders an incoming or already-held call, relative to other already-held calls for terminal 212. In a first example, if exchange 205 received (i) a first indication from terminal 212 that instant messaging is available and (ii) a second indication from the originating terminal that instant messaging is available, exchange 205 could move the call further back (i.e., to a lower priority) in the call queue associated with terminal 212. In this example, the originating terminal has an alternative method (i.e., other than through the phone call) for contacting terminal 212's user. Exchange 205 would instruct the caller to use instant messaging and would provide the instant messaging address to the caller.

In a second example, if exchange 205 received (i) a first indication from terminal 212 that instant messaging is available and (ii) a second indication from the originating terminal that instant messaging is not available, exchange 205 could maintain the call's position in the call queue associated with terminal 212. In this example, the originating terminal currently does not have the ability to reach terminal 212 other than through the phone call.

In a third example, exchange 205 received an indication from terminal 212 that instant messaging is available, but no availability indication from the originating terminal. Exchange 205 did receive, however, calling party identifier information along with the incoming call and has stored the information about the calling party or the originating terminal, or both. Based on the stored information, exchange 205 knows that the originating terminal has instant messaging capability. Therefore, exchange 205 could move the call further back in the call queue associated with terminal 212. Exchange 205 would instruct the caller to use instant messaging and would provide the instant messaging address to the caller.

In a fourth example, the call attribute used for sorting the calls held for terminal 212 is "estimated call length" and the call identifier of the call under consideration has an associated "short length" attribute value. Consequently, exchange 205 could place that call identifier in the sequence near other call identifiers that are associated with a short estimated call length.

In a fifth example, exchange 205 receives an incoming call intended for terminal 212 from the originating terminal and a telecommunications terminal address from terminal 212. Exchange 205 could choose to not change the ordering of the calls in the queue (i.e., maintain the "first-come, first-served" nature of the queue), but could pass the terminal address to the originating terminal for the purpose of offering the caller an alternative form of communication (e.g., via email, instant messaging, etc.).

After task 801, task execution proceeds to task 509.

Figure 9:
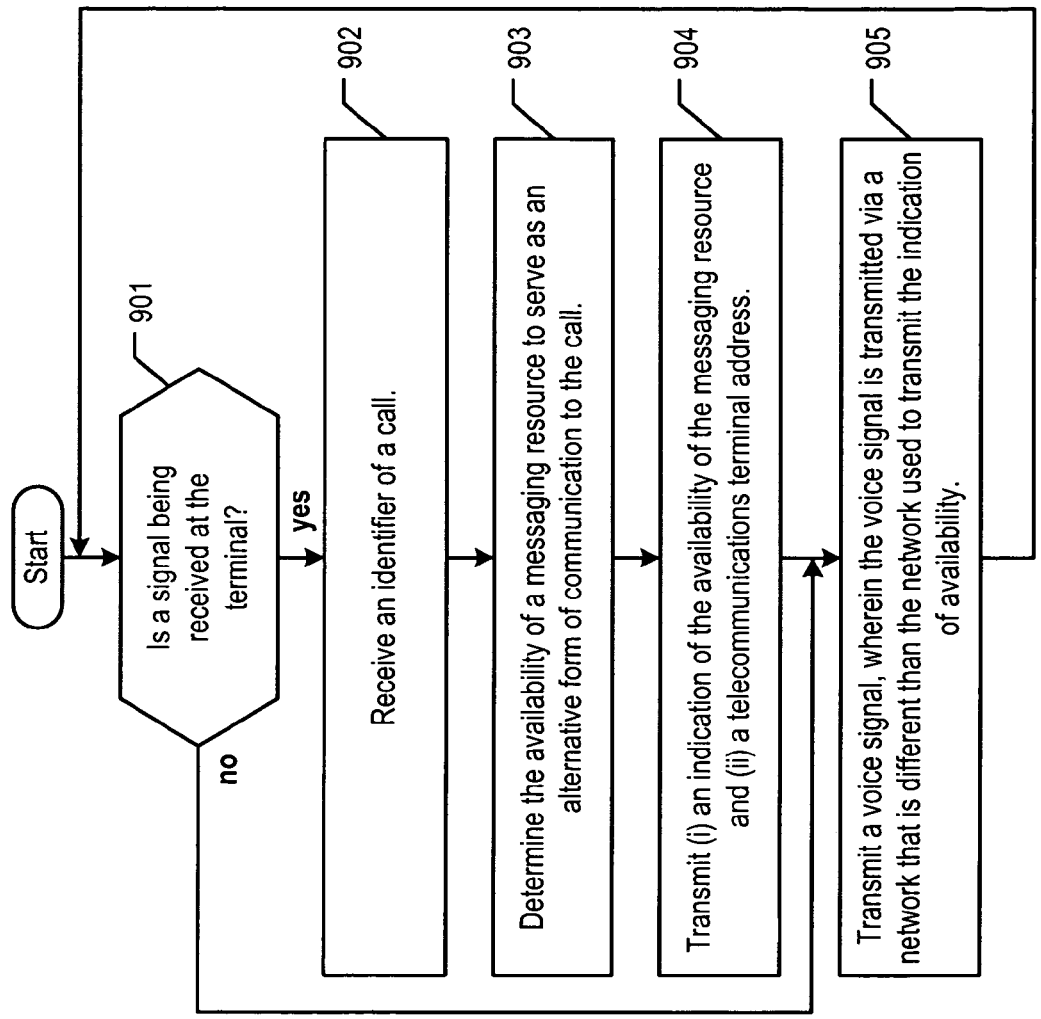
FIG. 9 depicts a flowchart of the operations of terminal 212 as it interacts with exchange 205.

FIG. 9 depicts a flowchart of the operations of terminal 212 as it interacts with exchange 205, in accordance with the illustrative embodiment of the present invention. Terminal 212 exemplifies the off-premises terminal for which exchange 205 is managing calls; however, as those who are skilled in the art will appreciate, the tasks described with respect to FIG. 9 can also apply to other terminals for which calls are intended. It will be clear to those skilled in the art which tasks depicted in FIG. 9 can be performed simultaneously or in a different order than that depicted.

At task 901, terminal 212 checks if it is receiving a signal that is related to one or more calls that are being held. If it is receiving a related signal, task execution proceeds to task 902. Otherwise, task execution proceeds to task 905.

At task 902, terminal 212 receives an identifier of a call that is intended for terminal 212. For example, terminal 212 might receive a call-waiting notification with a caller identifier or might receive another type of message that comprises the call identifier.

At task 903, terminal 212 determines the availability of a messaging resource. For example, terminal 212 might determine that its instant messaging capability is currently available.

At task 904, terminal 212 transmits an indication $A_1$ of the availability of the messaging resource. For example, it might transmit an indication that instant messaging is available. Terminal 212 also transmits, in some embodiments, a telecommunications terminal address (e.g., name: abc_company_tech103/domain: Yahoo or AOL, etc.) that identifies the address to which a message can be sent. As those who are skilled in the art will appreciate, the messaging resource or the telecommunications terminal address, or both, can vary on a call-by-call basis. For example, terminal 212 might have a first caller going to instant messaging, a second caller going to email at tech 12@company.com, and a third caller going to email at tech 32@company.com.

At task 905, terminal 212 transmits, to exchange 205, a voice signal that represents its user's speech, in well-known fashion. In some embodiments, terminal 212 transmits the voice signal via a different network (e.g., a cellular network, etc.) than the network (e.g., a wireless local area network, etc.) through which it transmits the availability indication $A_1$. Task execution then proceeds back to task 901.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) holding, at a private branch exchange, one or more calls intended for a first telecommunications terminal, wherein the first telecommunications terminal is an off-premises terminal to which the private branch exchange has extended at least one call;
   (b) receiving, from the first telecommunications terminal:
      (i) a first identifier that identifies a first call of the one or more calls,
      (ii) a first telecommunications terminal address,
      (iii) a second identifier that identifies a second call of the one or more calls,
      (iv) a second telecommunications terminal address, and
      (v) a voice signal from the first telecommunications terminal, wherein the first identifier and the voice signal are received via different networks;
   (c) transmitting, to the originating telecommunications terminal of the first call, a prompt to send a first message via a first messaging resource to the first telecommunications terminal address; and
   (d) transmitting, to the originating telecommunications terminal of the second call, a prompt to send a second message via a second messaging resource to the second telecommunications terminal address.

2. The method of claim 1 wherein the first messaging resource is one of (i) email, (ii) instant messaging, and (iii) short message service.

3. The method of claim 1 wherein the transmitting of the prompt depends on whether the first messaging resource is available at the originating telecommunications terminal of the first call.

4. The method of claim 1 wherein the first messaging resource and the second messaging resource are the same, and wherein the first telecommunications terminal address and the second telecommunications terminal address are different.

5. The method of claim 1 further comprising (d) receiving, from the originating telecommunications terminal of the first call, a value of a call attribute of the first call, wherein the first messaging resource is based on the value.

6. The method of claim 5 wherein the call attribute is one of (i) urgency, (ii) topic, and (iii) estimated call length.

7. A method comprising:
   (a) receiving:
      (i) an incoming call for a first telecommunications terminal,
      (ii) from the first telecommunications terminal and in response to the incoming call, a first indication of whether a messaging resource is available,
      (iii) from a second telecommunications terminal, a second indication of whether the messaging resource is available, and
      (iv) a voice signal from the first telecommunications terminal, wherein the first indication and the voice signal are received via different networks; and
   (b) reordering, based on the first indication and on the second indication, at least one identifier in a sequence of identifiers;
   wherein the sequence of identifiers represents calls that are intended for the first telecommunications terminal; and
   wherein each identifier in the sequence represents a different call, including an identifier in the sequence that represents a call originated by the second telecommunications terminal.

8. The method of claim 7 wherein a private branch exchange performs the reordering of the at least one identifier, and wherein the first telecommunications terminal is an off-premises terminal to which the private branch exchange has extended at least one call.

9. The method of claim 7 wherein the first indication is received via a wireless local area network, and wherein the voice signal is received via a cellular network.

10. The method of claim 7 further comprising:
    (c) receiving, from the first telecommunications terminal, a telecommunications terminal address; and
    (d) transmitting a prompt to the originating terminal of the incoming call to send a message to the telecommunications terminal address via the messaging resource.

11. The method of claim 7 further comprising:
    (c) receiving, from a second telecommunications terminal, a value of a call attribute of the incoming call;
    wherein the reordering of the at least one identifier is also based on the value.

12. The method of claim 11 wherein the call attribute is one of (i) urgency, (ii) topic, and (iii) estimated call length.

13. A method comprising:
    (a) receiving:
       (i) from a first telecommunications terminal:
          (1) a first indication of whether a messaging resource is available, and
          (2) a telecommunications terminal address, and
       (ii) from a second telecommunications terminal:
          (1) an incoming call for the first telecommunications terminal,
          (2) a second indication of whether the messaging resource is available, and
          (3) a value of a call attribute of the incoming call;
    (b) modifying the order in which the incoming call, relative to one or more other calls, is presented to the first telecommunications terminal, wherein the modifying is based on the first indication, the second indication, and the value of the call attribute; and
    (c) transmitting a prompt to the second telecommunications terminal to send a message via the messaging resource to the telecommunications terminal address.

14. The method of claim 13 wherein the call attribute is one of (i) urgency, (ii) topic, and (iii) estimated call length.

15. A method comprising:
(a) receiving, at a telecommunications terminal from a data-processing system,
   (i) a first identifier of a first call intended for the telecommunications terminal, and
   (ii) a second identifier of a second call intended for the telecommunications terminal; and
(b) transmitting, to the data-processing system,
   (i) a first indication of whether a first messaging resource that is to be used as an alternative to the first call for communicating with the telecommunications terminal's user is available,
   (ii) a second indication of whether a second messaging resource is available, and
   (iii) a first telecommunications address, wherein the first telecommunications address is an address that is compatible with the first messaging resource.

16. The method of claim 15 further comprising (c) transmitting, to the data-processing system, a second telecommunications address; wherein the second telecommunications address is an address that is compatible with the second messaging resource.

17. The method of claim 15 further comprising (c) transmitting a voice signal to the data-processing system, wherein the first indication and the voice signal are transmitted via different networks.

18. The method of claim 17 wherein the transmitting of the voice signal is via a cellular network, and wherein the transmitting of the first indication is via a wireless local area network.

* * * * *

UNITED STATES PATENT AND TRADEMARK OFFICE
CERTIFICATE OF CORRECTION

PATENT NO. : 7,616,751 B2 Page 1 of 1
APPLICATION NO. : 11/179737
DATED : November 10, 2009
INVENTOR(S) : David S. Mohler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1155 days.

Signed and Sealed this

Nineteenth Day of October, 2010

David J. Kappos
*Director of the United States Patent and Trademark Office*